United States Patent
Meyer Zu Drewer et al.

(10) Patent No.: US 6,508,899 B1
(45) Date of Patent: Jan. 21, 2003

(54) SYSTEM FOR APPLYING EDGE TRIM TO FURNITURE PANEL

(75) Inventors: Jens Meyer Zu Drewer, Ratingen (DE); Herbert Müller, Heiligenhaus-Isenbügel (DE)

(73) Assignee: W. Dollken & Co. GmbH, Essen (DE)

( * ) Notice: Subject to any disclaimer, the term of this patent is extended or adjusted under 35 U.S.C. 154(b) by 54 days.

(21) Appl. No.: 09/643,342

(22) Filed: Aug. 22, 2000

(30) Foreign Application Priority Data

Aug. 25, 1999 (DE) .......................................... 199 40 329

(51) Int. Cl.⁷ .............................................. B29C 73/06
(52) U.S. Cl. ...................... 156/196; 156/73.5; 156/202; 156/212; 156/216; 156/223; 156/250; 156/267; 156/269; 156/302
(58) Field of Search ........................ 156/73.5, 88, 196, 156/199, 200, 201, 202, 212, 216, 221, 223, 250, 269, 267, 270, 297, 299, 302, 244.17, 244.19, 308.2, 308.4, 308.6; 52/716.3, 716.4, 716.5, 717.03, 718.01, 782.1, 799.1, 800.11, 787.1, 802.11

(56) References Cited

U.S. PATENT DOCUMENTS

| | | | | |
|---|---|---|---|---|
| 3,959,537 A | * | 5/1976 | Loew | 428/31 |
| 5,197,256 A | * | 3/1993 | Martin | 52/808 |
| 5,456,957 A | * | 10/1995 | Jackson et al. | 428/31 |

* cited by examiner

*Primary Examiner*—Deborah Jones
*Assistant Examiner*—Vivek Koppikar
(74) *Attorney, Agent, or Firm*—Herbert Dubno; Andrew Wilford

(57) ABSTRACT

A thermoplastic trim strip is mounted to an edge face of a wood-core furniture panel by applying a face of the trim strip directly to the edge face and bonding the trim-strip face directly to the panel-edge face. The panel has outer faces terminating at the edge face and the trim strip is provided with edge lips that project past the broad faces when the strip is bonded to the edge face. The edge lips are melted over onto the panel faces and trimmed off where they project past the panel faces. A thin layer of glue can be applied between a face of the trim strip and the edge face and the trim-strip face is bonded to the panel-edge face by means of the glue layer.

8 Claims, 2 Drawing Sheets

SYSTEM FOR APPLYING EDGE TRIM TO FURNITURE PANEL

FIELD OF THE INVENTION

The present invention relates to a method of applying edge trim to a furniture panel. More particularly this invention concerns such a method and the panel produced thereby.

BACKGROUND OF THE INVENTION

In the production of many types of furniture, for instance tables or kitchen counters, the broad faces of a piece of fiberboard, chipboard, plywood or the like are covered with a decorative layer typically formed of plastic and adhered solidly to the panel, leaving the edges exposed. An edge trim, often matching the decor layer, is then applied to the narrow exposed edges of the board so that all visible surfaces have the desired appearance.

Typically the edge trim is made of a thermoplastic and is glued to the board edge. A layer of a bonding agent and a layer of adhesive are normally needed to bond the thermoplastic of the edge trim to the wood of the board. As a result there is a slight spacing producing an unattractive line between the normally matching edge trim and decor layer.

OBJECTS OF THE INVENTION

It is therefore an object of the present invention to provide an improved method of mounting an edge trim on a furniture panel.

Another object is the provision of such an improved method of mounting an edge trim on a furniture panel which overcomes the above-given disadvantages, that is which substantially eliminates the line between the edge trim and the decor layer of the panel.

A further object is to provide an improved furniture panel.

SUMMARY OF THE INVENTION

A thermoplastic trim strip is mounted to an edge face of a wood-core furniture panel according to the invention by applying a face of the trim strip directly to the edge face and bonding the trim-strip face directly to the panel-edge face. For instance high-frequency, e.g. ultrasonic, welding can be used to directly bond the parts together, eliminating a visible seam between the edge trim and the panel. The connection is extremely strong and, when the edge trim matches any decor layers on the panel, the edge trim appears to form a seamless continuation of the decor layers for the extremely attractive appearance of a more expensive solid-plastic panel.

According to the invention the panel has outer faces terminating at the edge face and the trim strip is provided with edge lips that project past the broad faces when the strip is bonded to the edge face. The method further has according to the invention the steps of melting the edge lips over onto the panel faces and trimming off the edge lips where they project past the panel faces. This ensures that even if the fit is not perfect, any gap between the edge trim and the panel edge is filled.

According to another feature of the invention, a thin layer of glue is applied between a face of the trim strip and the edge face and the trim-strip face is bonded to the panel-edge face by means of the glue layer. A polyurethane or APAO hot-melt adhesive can be used and will be virtually invisible. This is particularly true when the edges of the trim strip are extra-thick, giving the panel a concave shape turned toward the edge face so that, when pressed in place, the trim-strip edges fit solidly to the panel edge face. In this case the entire strip is pressed flat against the normally planar panel edge face so that in effect the strip edges are prestressed against the panel edge face.

In accordance with the invention the glue layer and the edge trim are of the same color. This further reduces the likelihood that the seam will be visible, whether the glue is a hot-melt one or a standard solvent-based adhesive.

The panel has outer faces terminating at the edge face and the trim strip is provided with edge lips that project past the broad faces when the strip is bonded to the edge face. In addition the edge lips are melted over onto the panel faces and the edge lips are trimmed off where they project past the panel faces.

The panel outer faces are formed by plastic decor layers, and during the bonding the edge trim is pressed against the edge face.

The glue layer includes a bonding agent.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
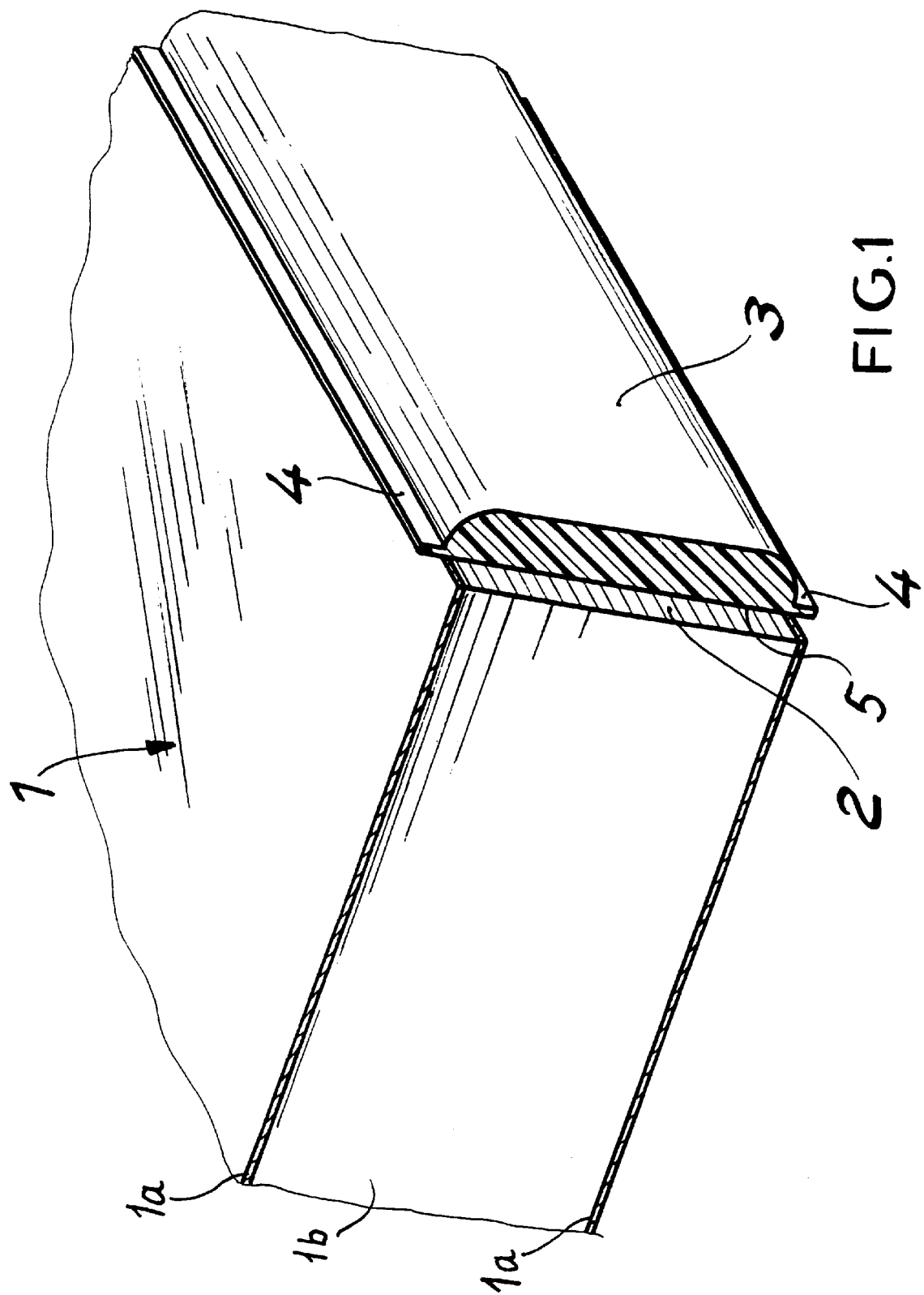
FIG. 1 is a partly sectional view of an edge trim and panel according to the invention.

As seen in FIG. 1 a furniture panel 1 according to the invention has a pair of plastic decor layers 1a flanking a plywood core 1b and has a planar but narrow edge face 2 to which is applied a thermoplastic edge trim 3. The trim strip 3 has on its opposite edges a pair of outwardly extending unitary lips 4 that project past the decor layers 1a which the strip 3 normally exactly matches.

Figure 2:
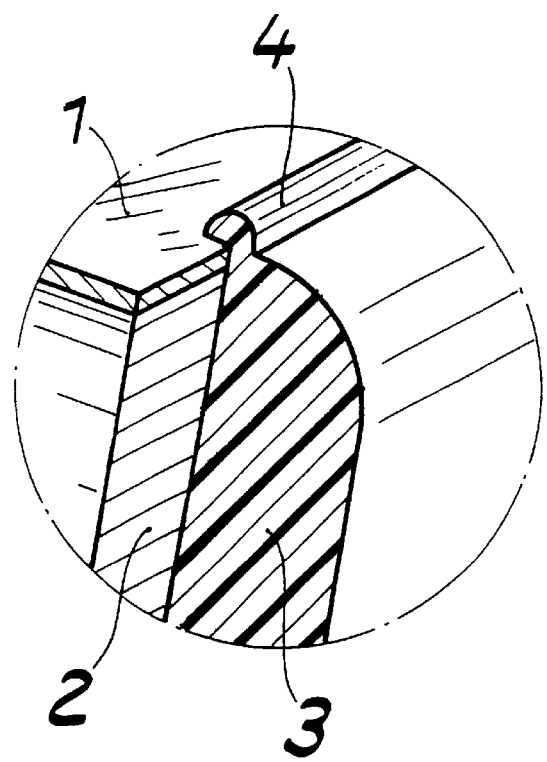
FIG. 2 is a large-scale view of the assembly of FIG. 1 in a later stage of production.
Figure 3:
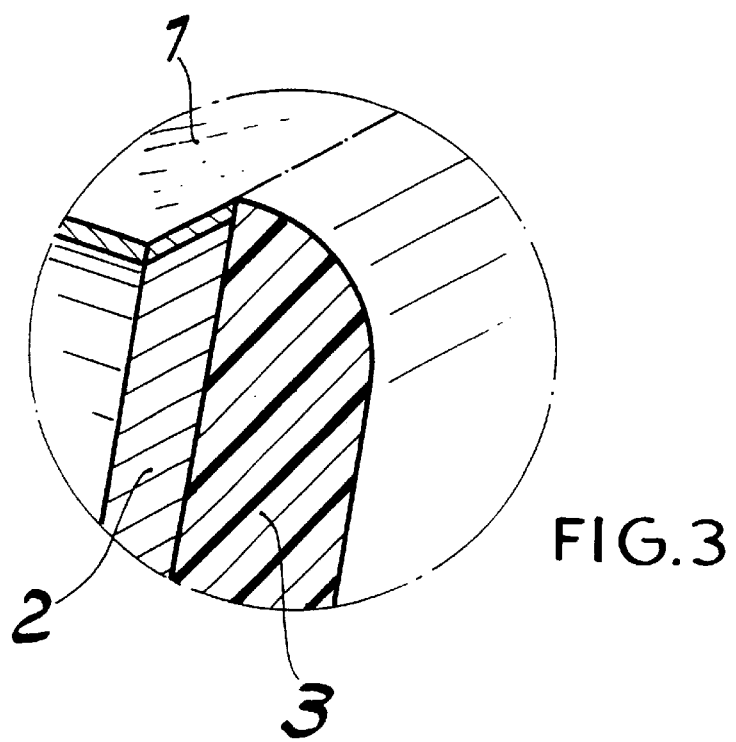
FIG. 3 is a view like FIG. 2 showing the finished assembly.

According to the invention this trim strip 3 can be bonded to the edge face 2 either directly by pressing it there-against while heating it ultrasonically, so that plastic of the strip 3 melts enough to bond to the face 2. At the same time or subsequently the edge lips 4 as shown in FIG. 2 are melted over the decor layers 1a and then as shown in FIG. 3 are trimmed off to make a virtually invisible seam between the matching plastics. The edge strip 3 is then normally rolled to ensure full surface contact with the panel 1.

Alternately it is possible to provide a layer 5 of adhesive, and even of a bonding agent, between the edge face 2 and the trim 3. Even in this situation the edge lips 4 are melted over and trimmed off as shown in FIGS. 2 and 3 to form an invisible seam.

We claim:

1. A method of mounting a thermoplastic trim strip to an edge face of a wood-core furniture panel having broad outer faces terminating at the edge face, the method comprising the steps of:

applying a face of the trim strip directly to the edge face;

bonding the trim-strip face directly to the panel-edge face such that edge lips of the trim strip project past the broad outer faces;

melting the edge lips over onto the broad outer faces; and trimming off the edge lips where they project past the broad outer faces.

2. The trim-mounting method defined in claim 1 wherein the bonding is effected by welding the trim-strip face to the panel-edge face.

3. The trim-mounting method defined in claim 2 wherein the broad outer faces are formed by plastic decor layers.

4. A method of mounting a thermoplastic trim strip to an edge face of a wood-core furniture panel having broad outer faces terminating at the edge face, the method comprising the steps of sequentially:

applying a thin layer of glue between a face of the trim strip and the edge face;

bonding the trim-strip face to the panel-edge face by means of the glue layer such that edge lips of the trim strip project past the broad outer faces;

melting the edge lips over onto the panel faces; and trimming off the edge lips where they project past the panel faces.

5. The trim-mounting method defined in claim 4 wherein the glue layer and the edge trim are of the same color.

6. The trim-mounting method defined in claim 4 wherein the panel outer faces are formed by plastic decor layers.

7. The trim-mounting method defined in claim 4 wherein during the bonding the edge trim is pressed against the edge face.

8. The trim-mounting method defined in claim 4 wherein the glue layer includes a bonding agent.

* * * * *